United States Patent [19]

Sues et al.

[11] Patent Number: 4,910,768
[45] Date of Patent: Mar. 20, 1990

[54] AUTOMATIC BALANCING CIRCUIT FOR LONGITUDINAL TRANSMISSION SYSTEM

[75] Inventors: John M. Sues, New York; Jing H. Sun, Roosevelt Island, both of

[73] Assignee: The Inteleplex Corporation, Paramus, N.J.

[21] Appl. No.: 228,017

[22] Filed: Aug. 2, 1988

[51] Int. Cl.⁴ .................. H04B 3/30; H04M 11/06
[52] U.S. Cl. .................... 379/394; 379/90; 379/398
[58] Field of Search ............... 370/5; 379/42, 47, 50, 379/90, 93, 344, 345, 391, 394, 398, 403, 404, 443

[56] References Cited

U.S. PATENT DOCUMENTS

| | | | |
|---|---|---|---|
| 3,982,080 | 9/1976 | Ukeiley | 379/403 |
| 4,096,362 | 6/1978 | Crawford | 379/403 |
| 4,493,948 | 1/1985 | Sues et al. | 379/42 |
| 4,528,422 | 7/1985 | Cupani | 379/42 |
| 4,588,856 | 5/1986 | Cohen | 379/398 |

FOREIGN PATENT DOCUMENTS 236557 11/1985 Japan .................. 379/404

OTHER PUBLICATIONS

R. Apfel, H. Ibrahim, R. Ruebush; "Signal-Processing Chips Enrich Telephone Line-Card Architecture"; Electronics; May 5, 1982; pp. 113-118.

Primary Examiner—Jin F. Ng
Assistant Examiner—Randall P. Myers
Attorney, Agent, or Firm—Lieberman, Rudolph & Nowak

[57] ABSTRACT

Transmission and reception of first and second information signals over a telephone local loop, simultaneous with voice communications over the same local loop, is possible if the phase and amplitude of said first and second signals are perfectly balanced. The inventive apparatus detects differences in phase and amplitude between said first and second signals, and generates digital control signals to reduce the phase and amplitude differences to zero. Adjustment of phase and amplitude is completely automatic and rapidly accomplished.

9 Claims, 9 Drawing Sheets

AUTOMATIC BALANCING CIRCUIT FOR LONGITUDINAL TRANSMISSION SYSTEM

FIELD OF THE INVENTION

This invention relates to the field of information transfer and, more particularly, to an automatic balancing circuit for a longitudinal transmission system in which information is carried over the telephone local loop, simultaneous with and without disturbing normal voice communications over the same local loop.

BACKGROUND OF THE INVENTION

The number of worldwide telephone subscribers is substantial and rapidly increasing. Each such subscriber is generally connected to a telephone central office via a metallic pair of wires identified as the telephone "local loop." This huge network of communications paths is grossly under utilized as it is normally used only for sporadic voice communications between the telephone subscriber, the telephone central office, and other telephone subscribers. In addition, there is a substantial and rapidly growing demand for data access to telephone subscribers in order to provide such services as interactive t.v. viewing, at-home shopping and banking services, monitoring alarm conditions in the home or office, and a host of other applications in which it would be desirable to transmit data to, and receive data from, the telephone subscriber. The known under utilization of the telephone local loop network, and the growing demand for access to the telephone subscriber, has sparked a search for means to utilize the telephone local loop for information transfer, while leaving the underlying voice communication undisturbed.

Systems now exist which permit the simultaneous transmission of both voice and a secondary information signal over the local loop. One such system is described in U.S. Pat. Nos. 4,493,948 and 4,528,422, assigned to The Inteleplex Corporation, the same assignee to which is assigned the instant invention. Such systems generally comprise an information terminal coupled to the ring-/tip conductor pair at a first location, such as the location of the telephone subscriber, and a companion information terminal coupled to the same ring/tip pair at a second location, such as the telephone central office. The information terminals are designed to transmit complementary signals, (both in terms of phase and amplitude) on the ring and tip conductors between a respective conductor and earth ground. These signals are carefully balanced longitudinally between the tip and ring conductors, and when precisely balanced, the signals will not disturb the normal underlying voice communications. It is, of course, understood that voice communication is not disturbed because the telephone equipment works on the principal of detecting a difference in voltage and/or phase between the tip and ring conductors, which makes perfectly balanced signals essentially invisible to the telephone equipment.

Systems, such as those described in U.S. Pat. Nos. 4,493,948 and 4,528,422, provide excellent service in permitting a secondary information signal to be superimposed over normal voice communications carried on the local loop. However, in order for such systems to operate properly, perfect signal balance must be maintained, at all times, between the tip and ring conductors.

A problem arises in maintaining balanced signals when transmitting over metallic wire pairs of different lengths, with differences in manufacturing tolerances, and various environmental conditions that can change the impedance of either of the conductors in the pair. Any such change in impedance, even very small changes, results in unbalanced longitudinal signals (differences in phase and amplitude) and a resultant unwanted interference (cross-talk) with voice communication being carried over the local loop.

Previous solutions to this problem have included the use of manually adjustable potentiometers within the local loop that require periodic adjustment by a technician. However, the maintenance expenses alone, associated with a circuit that must be manually adjusted would render it impractical for wide spread use, such as in conjunction with the existing telephone network.

It is, therefore, an object of the instant invention to provide method and apparatus for balancing longitudinal signals being transmitted over a metallic wire pair such as the telephone local loop.

It is a further object of the instant invention to eliminate the need to manually adjust the varying impedance of each pair of conductors in a metallic wire pair such as the telephone local loop, when transmitting longitudinal signals over the local loop.

It is a still further object of the instant invention to provide simple and relatively inexpensive equipment to automatically balance longitudinal signals being transmitted over a metallic wire pair such as the telephone local loop.

SUMMARY OF THE INVENTION

In accordance with a first aspect of the invention, first and second signals transmitted and received over a telephone local loop are balanced in phase and amplitude, said first signal being coupled between a ring conductor of said telephone local loop and earth ground, and said second signal being coupled between a tip conductor of said telephone local loop and earth ground.

It is a feature of the invention that differences in phase and amplitude between said first and second signals are detected by apparatus coupled to said tip and ring conductors.

It is a further feature of the invention that programmable digital processing equipment, responsive to differences in phase and amplitude between said first and second signals, generates digital control signals indicative of said phase and amplitude differences.

It is a still further feature of the invention that apparatus responsive to said digital control signals equalize the amplitude and phase of said first and second signals.

It is another feature of the invention that said equalized first and second signals do not interfere with voice transmission occurring simultaneously over said telephone local loop.

These and other objects and features of the invention will be more fully appreciated from the following detailed description when taken in conjunction with the accompanying drawings in which:

DETAILED DESCRIPTION

Figure 1:
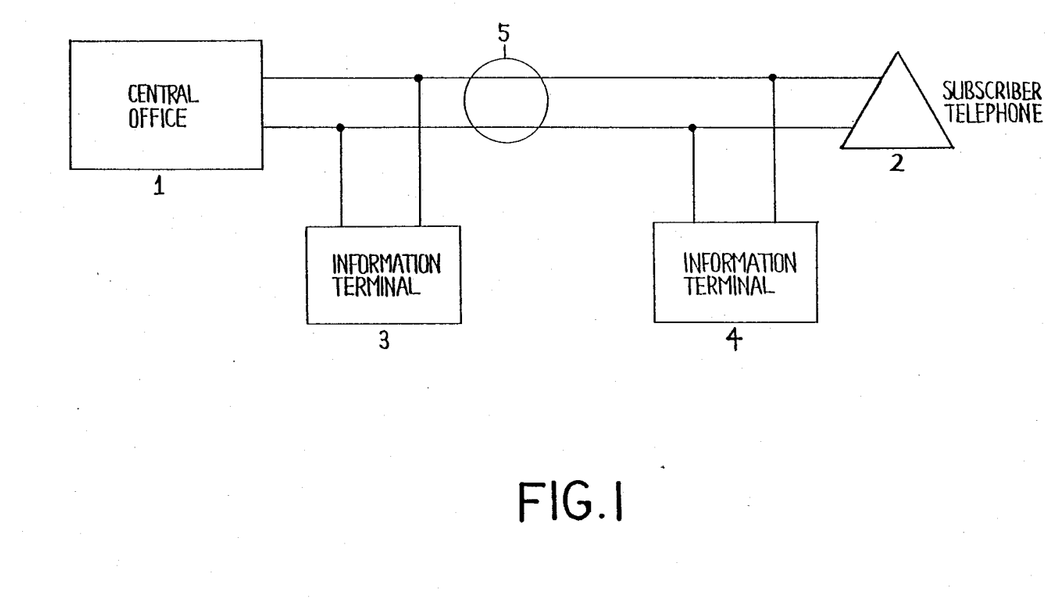
FIG. 1 is a block diagram representation of the manner in which the instant invention is utilized in conjunction with the existing telephone network.

Referring now to FIG. 1, there is shown a generalized block diagram of a longitudinal transmission system in which a secondary information transfer system utilizes the telephone local loop to transfer information without disturbing normal voice communications. More particularly, the telephone central office 1 is shown connected to a subscriber telephone 2 via local loop 5. Connected in parallel with the central office is information terminal 3, while information terminal 4 is connected in parallel with the subscriber telephone. The system is designed to permit information terminals 3 and 4 to transmit information to each other at the same time that voice communication is occurring between the subscriber telephone and the central office. It is of course understood that appropriate equipment would be provided at the telephone central office to transmit the information received from information terminal 3 to any desired location and to forward information to information terminal 3.

The system shown in FIG. 1 permits the simultaneous transmission of both voice and secondary information signals over the local loop. However, such systems require that the longitudinal signals utilized to transmit the secondary information be continually balanced such that there is no difference in phase and amplitude between the signals present on the tip and ring conductors. As long as these signals remain balanced, the information transmission will not disturb normal voice communications.

It is understood that local loop 5 can be of varying lengths, which length, and impedance can change depending upon, for example, the movement of the metallic pair during severe wind conditions. Also, of course, environmental conditions such as excessive heat, rain or icing can serve to change the impedance of the metallic pair of conductors comprising local loop 5. Any such change in impedance, even very small changes, results in unbalanced longitudinal signals and resultant interference with voice communications. Accordingly, it is important that both information terminal 3, and information terminal 4, include apparatus to continuously and automatically insure that the longitudinal signals remain balanced so as not to disturb normal voice communications over the local loop.

Figure 2:
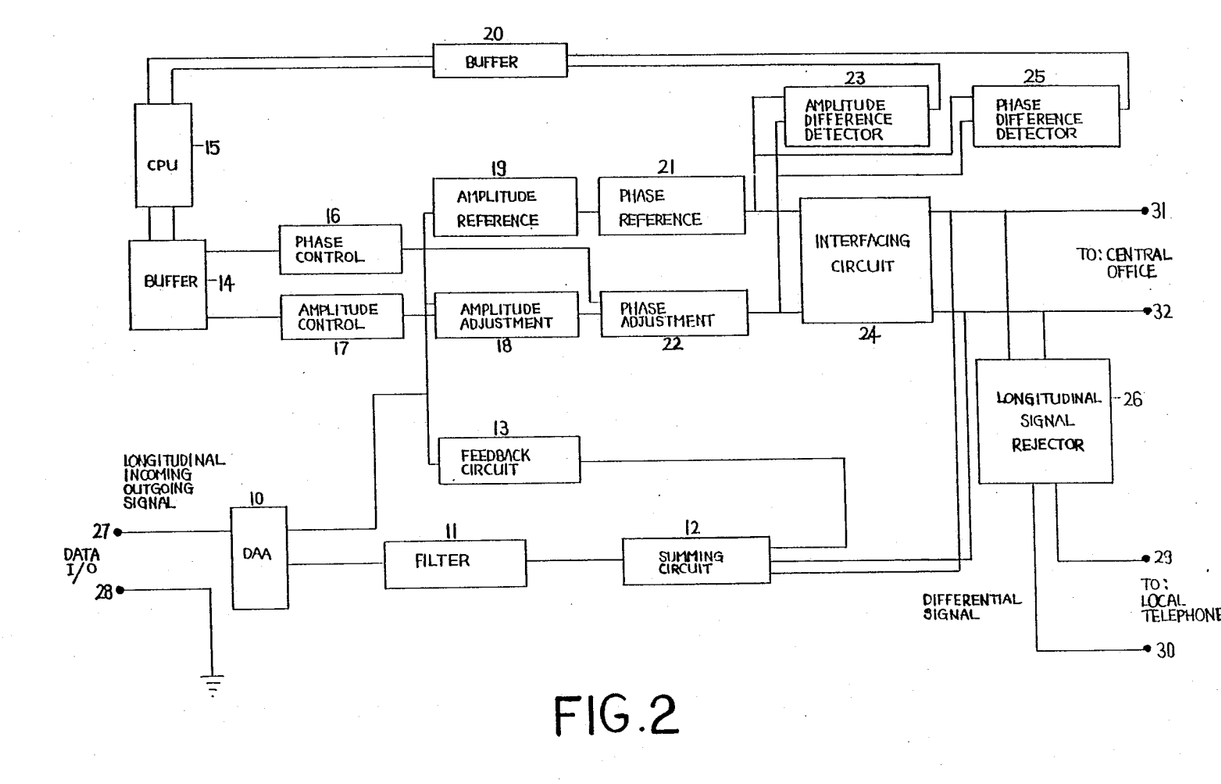
FIG. 2 is a block diagram representation of the instant invention illustrating the various circuit elements of the inventive balancing circuit.

Referring now to FIG. 2 there is shown the automatic balancing circuit of the instant invention, which circuit would be included in each of information terminals 3 and 4 shown in FIG. 1. As indicated in FIG. 2, terminals 31 and 32 of the balancing circuit are connected to tip and ring of the local loop. Similarly, terminals 29 and 30 of the automatic balancing circuit are connected to the subscriber telephone while terminals 27 and 28 would be connected to an information terminal such as information terminal 3 or 4.

Transfer of information from the information terminal flows from terminals 27 and 28 through Data Access Arrangement (DAA) 10 and from there to Amplitude Reference 19 and Amplitude Adjustment 18. The DAA is a standard off-the-shelf component manufactured, for example, by National Semi-Conductor, the function of which is to selectively cancel the strong outgoing signal, which otherwise could possibly loop back and overcome a weaker incoming signal. The DAA circuit is described in "Advanced Micro Device Manual-AM 7910 FSIC Modem Technology Manual" published by Advanced Micro Devices.

The Amplitude Reference circuit 19 functions to provide a fixed amplitude reference to which the outgoing signal amplitude is compared. If adjustment is required of the amplitude, this adjustment is accomplished by Amplitude Adjustment Circuit 18 in a manner to be described hereinafter.

The outgoing signal is next applied to Phase Reference Circuit 21 and Phase Adjustment Circuit 22. Phase Reference Circuit 21 provides a fixed phase reference to which the phase of the outgoing signal is compared and Phase Adjustment Circuit 22 provides adjustment to that phase if adjustment is required in a manner to be described hereinbelow.

The Phase Reference and Phase Adjustment Circuits are connected to Interface Circuit 24, Amplitude Difference Detector 23, and Phase Difference Detector 25. The Amplitude Difference Detector determines whether there is a difference in amplitude between the longitudinal signals being transmitted over the tip and ring conductors. Similarly, Phase Difference Detector 25 determines whether there is a phase difference between the tip conductor and ground and the ring conductor and ground.

The output of Amplitude Difference Detector 23 and Phase Difference Detector 25 are applied to Buffer 20 and from there to Central Processing Unit (CPU) 15. CPU 15 is a microprocessor appropriately programmed to identify the occurrence of differences in phase and/or amplitude in the outgoing longitudinal signals. Upon the occurrence of phase or amplitude differences, the CPU applies correction commands to Phase Control Circuit 16, and Amplitude Control Circuit 17 via Buffer Circuit 14. Phase Control Circuit 16 in turn commands Phase Adjustment Circuit 22 to apply appropriate phase adjustments to the outgoing signals, to attain zero phase difference between the longitudinal signals present on tip and ring conductors. Similarly, Amplitude Control Circuit 17 provides appropriate control signals to Amplitude Adjustment Circuit 18 to attain zero amplitude difference between the longitudinal signals tip and ring conductors.

After an appropriate settling interval, CPU 15 accurately adjusts both phase and amplitude, such that the longitudinal signals are perfectly balanced. This perfectly balanced signal is applied to Interface Circuit 24, which is designed to improve the signal to noise ratio of the outgoing signal. As such circuits are well known, no further description of Interface Circuit 24 will be given herein. The outgoing signal is then applied to tip and ring conductors 31 and 32, and from there to the telephone central office.

Incoming longitudinal signals are applied to tip and ring conductors 31 and 32 and from there to Summing Circuit 12. Summing Circuit 12 will not pass incoming differential signals unless they are identical in amplitude and out of phase by 180 degrees. Also applied to Summing Circuit 12, is the output signal inverted by Feedback Circuit 13. By feeding back the inverted outgoing signal, it is possible to cancel any possible interference between the strong outgoing signal, and the weaker incoming signal. Filter 11 is as simple band pass filter. As feed back Circuit 13 and filter 11 are well known circuit types they will not be further described herein.

Also connected to tip and ring conductors 31 and 32, is Longitudinal Signal Rejector circuit 26, which projects the integrity of the differential voice and ringing signals by rejecting longitudinal signals. This ensures that the differential signals, which are utilized to carry normal voice, ringing and off-hook information, are appropriately transferred to the subscriber telephone and to the telephone central office, without interference by the longitudinal signals which are rejected from this circuit path. Each of the circuits in FIG. 2 will now be described hereinafter in greater detail.

Figure 3:
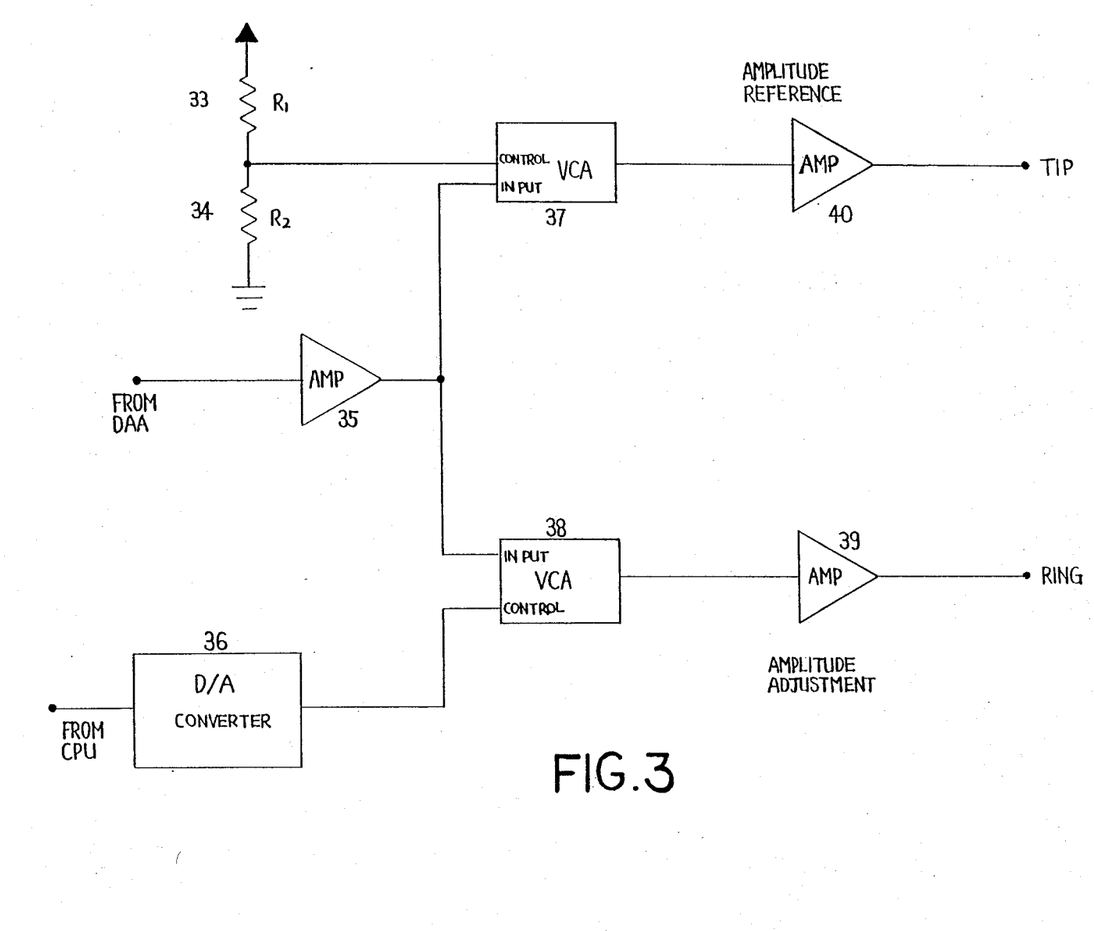
FIG. 3 describes the amplitude reference and amplitude adjustment circuitry shown in FIG. 2.

Referring now to FIG. 3, there is shown the circuitry for Amplitude Reference Circuit 19 and Amplitude Adjustment Circuit 18. More particularly, outgoing signals from DAA 10 are applied to amplifier 35, and from there to voltage controlled amplifiers 37 and 38. The control input of voltage controlled amplifier 37 is a fixed voltage reference determined by the impedance ratio between resistors 33 and 34. Accordingly, the output of amplifier 37 is a fixed amplitude value for the signals appearing on the tip conductor.

The control input for voltage controlled amplifier 38 is the output of digital-to-analog (D/A) converter 36. D/A converter 36 is in turn driven by digital control signals from CPU 15. As previously described, the control signals from CPU 15 serve to direct the appropriate Amplitude Adjustment based on the detection of differences in amplitude between the longitudinal signals on the tip and ring conductors. Accordingly, based on the digital control signal received from CPU 15, which signal is converted to an analog signal by D/A converter 36, amplifier 38 proceeds to adjust the output amplitude of the signal received from DAA 10 and appearing on the ring conductor. Amplifiers 39 and 40 are standard amplifier circuits and will not be described in greater detail herein.

Figure 4:
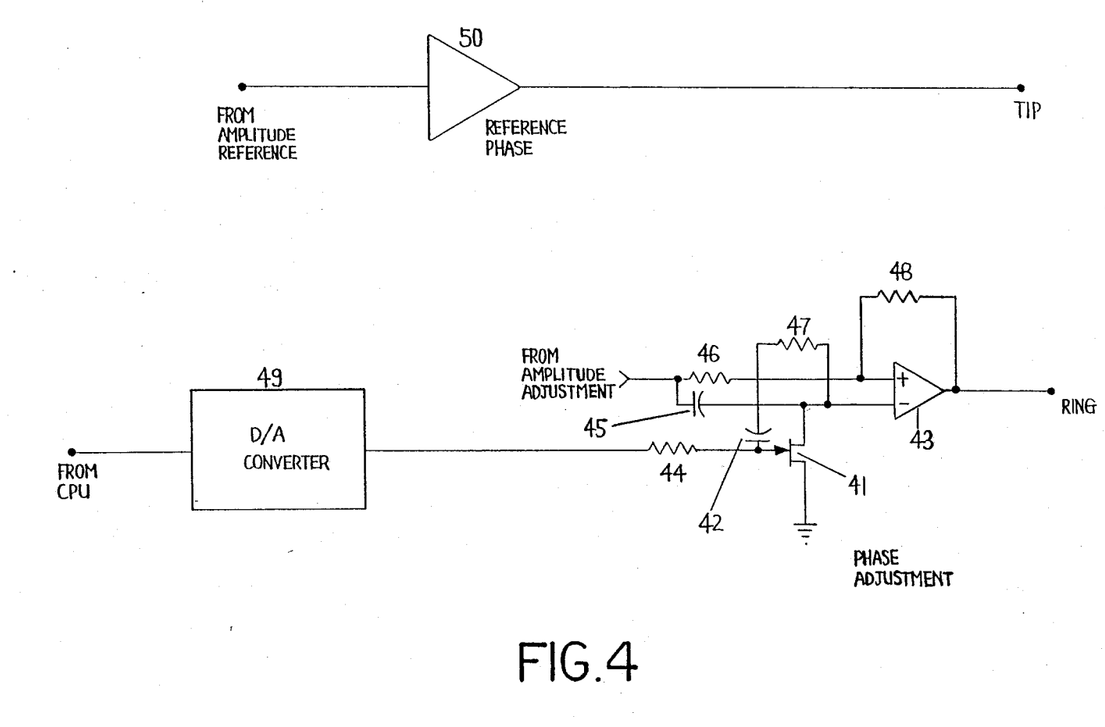
FIG. 4 illustrates the phase reference and phase adjustment circuitry shown in FIG. 2.

Referring now to FIG. 4, there is shown the Phase Reference Circuit 21 and the Phase Adjustment Circuit 22. As indicated, the Phase Reference Circuit is simply an amplifier 50 which serves to amplify the output of the Amplitude Reference Circuit 19 and apply that signal to the tip conductor. Similar to the Amplitude Adjustment Circuit, the Phase Adjustment Circuit consists of amplifier 43 and bias resistors 47 and 48. The output of Amplitude Adjustment Circuit 18 is applied to amplifier 43 via coupling resistor 46 and coupling capacitor 45. D/A converter 49 is driven by commands from CPU 15 as previously described with respect to FIG. 3 and D/A converter 36. The analog output of D/A converter 49 is applied to resistor 44, and from there to capacitor 42 and FET transistor 41. FET transistor 41 acts as a variable resistor, which in conjunction with capacitor 45, provides an adjustable phase shift circuit.

Figure 5:
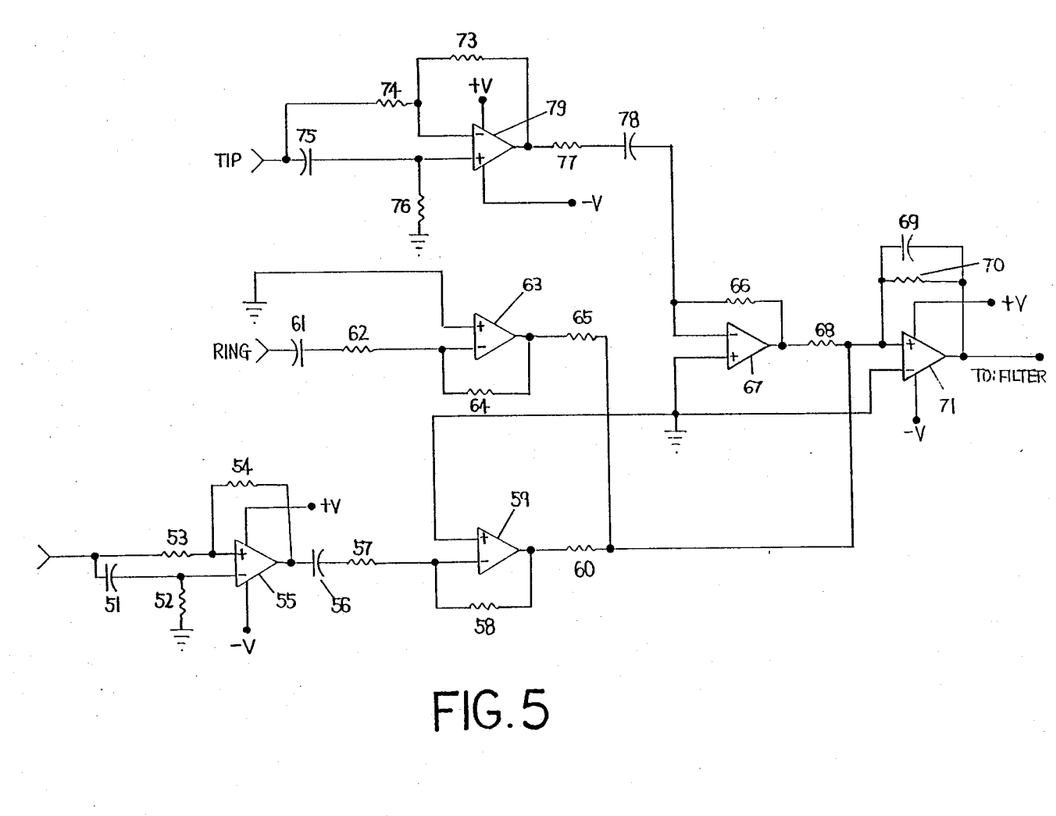
FIG. 5 illustrates the signal summing circuit shown in FIG. 2.

Referring now to FIG. 5 there is shown the details of Summing Circuit 12 shown in FIG. 2. More particularly, applied to circuit 12 are tip and ring inputs, as well as the input from DAA 10 applied to the Summing Circuit via feedback circuit 13. The output of the summing circuit is applied to filter 11 as shown in FIG. 2.

It is the purpose of the Summing Circuit to block incoming longitudinal signals that are not perfectly balanced, and to cancel any effect the strong output signal may have on the weaker incoming signal.

More particularly, operational amplifier 79 functions as a phase shifting circuit for signal received from the tip conductor. Phase is adjusted by either replacing resistor 73 with alternative resistance values, or by making resistor 76 a potentiometer. The adjustment to phase would typically be made either at the factory, or upon installation of the circuitry. Once adjusted, any further adjustments necessary would be handled by the automatic adjustment circuits described above. The remaining components surrounding operational amplifier 79, including resistors 74, 77 and 76, as well as capacitor 75 and 78, function as well known biasing and coupling networks whose function need not be further described. The output of amplifier 79 is applied to an amplitude adjustor which consists of amplifier 67 and resistor 66 as well as coupling resistor 68. By varying the value of resistor 66, it is possible to adjust the amplitude of the signal from the tip conductor, which signal is then applied to resistor 68.

Similarly, the signal appearing on the ring conductor is coupled through capacitor 61, and applied through resistor 62 to one terminal of Amplitude Adjustment circuit 63. With this circuit it is possible to adjust the amplitude of incoming signals by changing the value of resistor 64. This signal is then coupled through resistor 65 and applied to resistor 68. It can be appreciated that if the phase and amplitude of the incoming signals are not balanced, the output of amplifier 71 will be equal to zero.

The outgoing signal from the DAA, as applied through inverting feedback circuit 13, is applied through resistor 53 and coupling capacitor 51 to the plus and minus terminals of amplifier 55. This amplifier functions as a phase adjustment circuit, which phase can be adjusted by varying the value of resistor R52. Similarly, amplifier 59 functions as an Amplitude Adjustment circuit, which amplitude can be adjusted by varying the value of resistor 58. If these components are properly adjusted, any effect by the strong outgoing signal on the incoming signal will be cancelled.

Any components in FIG. 5, not described herein, function as normal biasing or coupling components well known in the art for which no description is necessary.

Figure 6:
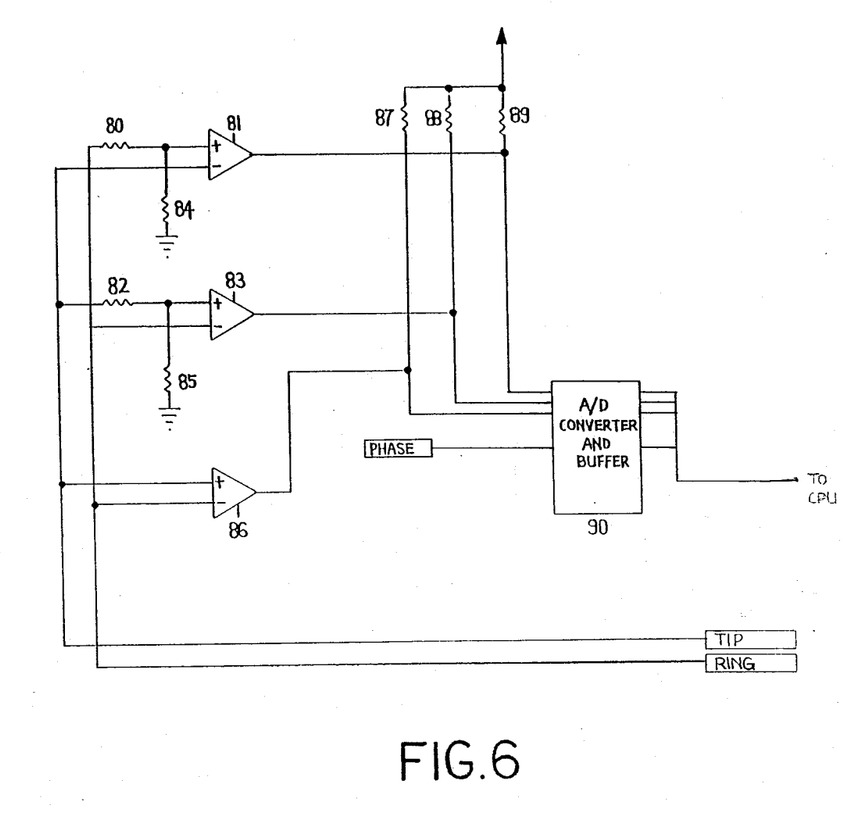
FIGS. 6 and 6A the amplitude difference detector, and buffer shown in FIG. 2.
Figure 6A:
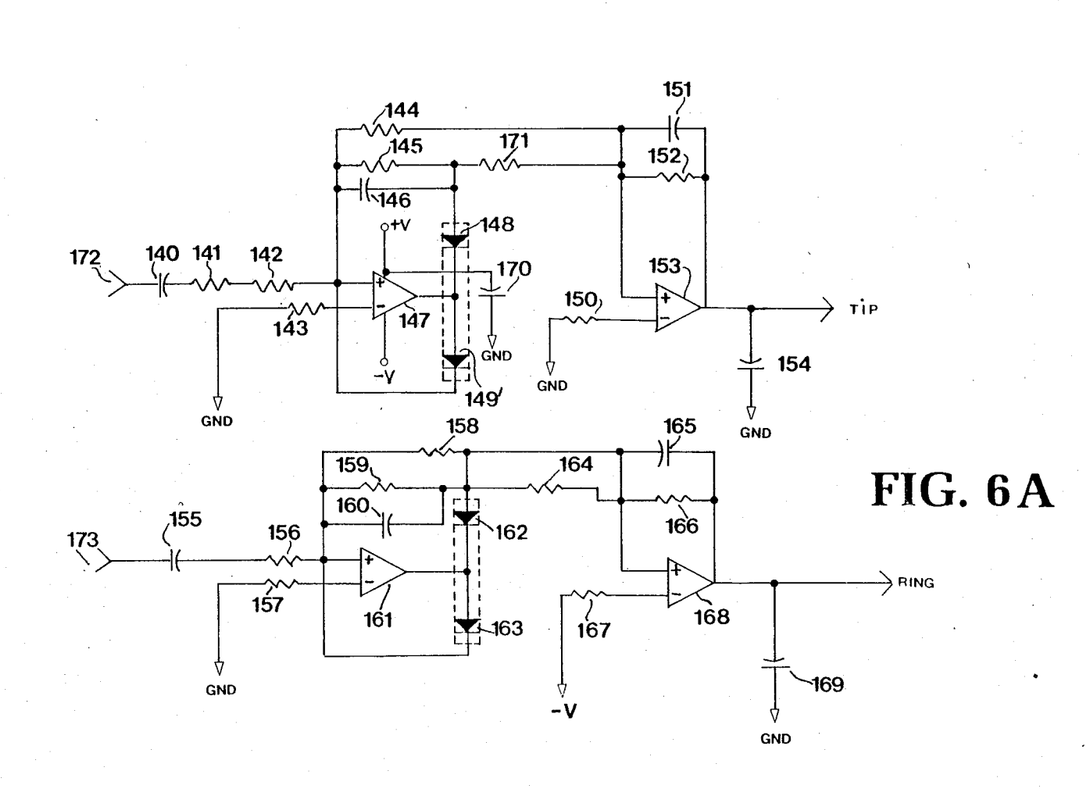

Referring now to FIGS. 6 and 6A, there is shown the details of the Amplitude Difference Detector Circuit 23 shown in FIG. 2, as well as Buffer 20.

The outgoing longitudinal signals from circuits 21 and 22 (FIG. 2) are applied to input terminals 172 and 173 in FIG. 6A. The circuitry shown in FIG. 6A functions to provide a positive output signal equivalent to the magnitude of the input signal. More particularly, amplifiers 147 and 161, along with associated diodes 148, 162 and 163, serve to rectify the incoming signals applied to input terminals 172 and 173. Components 140-146 and 155-160 function as biasing circuitry for amplifiers 147 and 161 in a well-known manner. The rectified signals are then passed to amplifiers 153 and 168 via components 164 and 171, where they are amplified and passed via the Tip and Ring output terminals to the Tip and Ring input terminals in FIG. 6. Components 150-152, 154 and 165-167, and 169 function as biasing and coupling components. the tip and ring terminals shown in FIG. 6, the longitudinal signals are presented to three differential amplifiers, 81, 83 and 86. Element 90, shown in FIG. 6, functions as an analog to digital converter and Buffer circuit 20. The output of the buffer circuit is applied to CPU 15 shown in FIG. 2.

Operational amplifier 81 is utilized to determine if there is a negative difference in amplitude between the longitudinal signals on the tip and ring conductors with the output being applied to the A/D converter/buffer 90. Similarly, amplifier 83 detects if there is a positive difference between the amplitude of the longitudinal signals and this information is also applied to the A/D converter/buffer. Amplifier 86 detects whether the longitudinal signals are essentially equal in amplitude and this information is applied to the A/D converter/buffer. The output of the A/D converter/buffer is a digital signal representative of the negative and positive differences in amplitude of the longitudinal signals, which may occur from time to time. This digital signal is applied to CPU 15, and CPU 15 generates appropriate control signals to adjust the amplitude as described above. Once the amplitude difference has reached zero, this information will be translated by the amplifiers 81, 83, 86 and A/D converter/buffer 90 into a digital signal indicating to the CPU that zero difference in amplitude has been reached. Resistors 87, 88 and 89 provide an appropriate biasing network, and resistors 80, 84, 82 and 85 are appropriate biasing and coupling arrangements.

Figure 7:
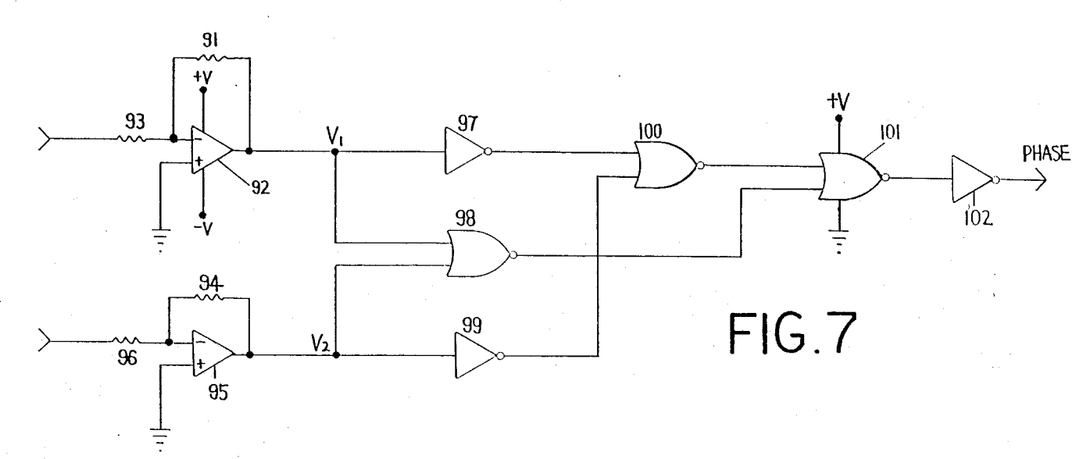
FIG. 7 illustrates the phase difference detection circuitry shown in FIG. 2.
Figure 7A:
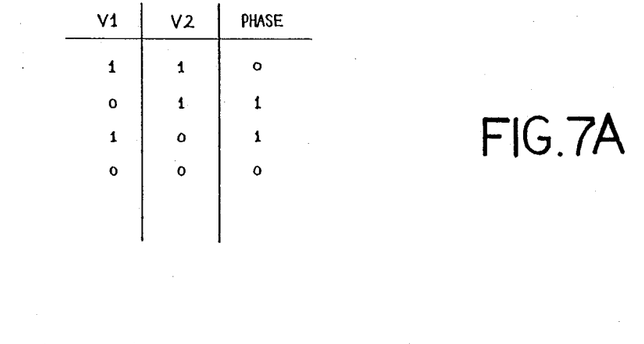
FIG. 7A comprises a truth table illustrative of the operation of the circuit in FIG. 7.

Referring now to FIGS. 7 and 7A, there is shown the Phase Difference Detector Circuit 25. More particularly, the signals appearing on the tip and ring conductors are applied to resistors 93 and 96 respectively, and from there to amplifiers 92 and 95. The outputs of amplifiers 92 and 95 are shown as V1 and V2 in the truth table shown in FIG. 7A. As indicated in the truth table, when outputs V1 and V2 are both equal the phase output of inverter 102 is equal to zero. Similarly, if V1 and V2 are not equal, the phase output of inverter 102 is equal to a logical 1 level. Inverters 97 and 99, and gates 98, 100 and 101 function in a standard, well-known, manner and will not be further described. This output of gate 102 is applied to the phase input on buffer 90 shown in FIG. 6. CPU 15, shown in FIG. 2, translates the phase differences shown in the truth table to appropriate phase control signals to adjust the phase as described above.

Figure 8:
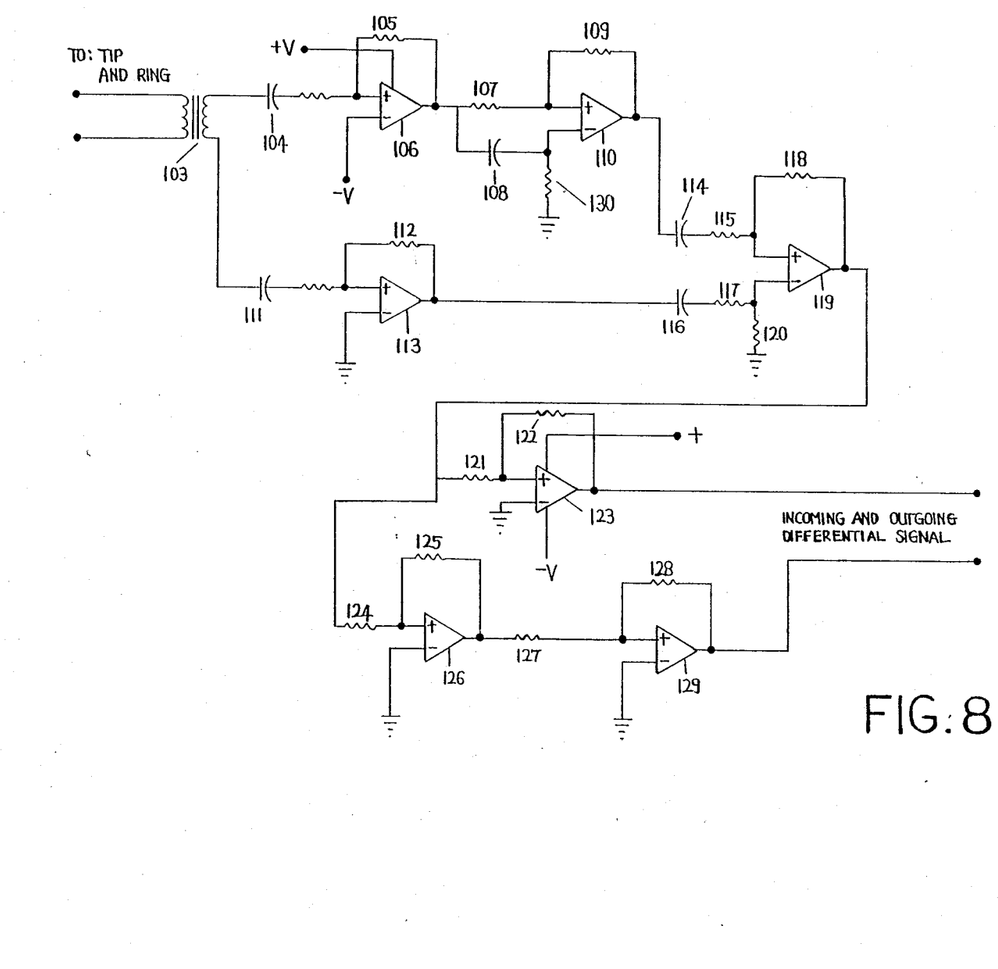
FIG. 8 describes the longitudinal signal rejecter circuit shown in FIG. 2.

Referring now to FIG. 8, there is shown the details of the longitudinal signal rejector circuit shown at 26 in FIG. 2. As discussed previously, the purpose of this circuit is to protect the integrity of the differential signal by rejecting longitudinal signals from its out of phase signal path. Incoming longitudinal signals are applied to the tip and ring terminals of transformer 103. Most of the longitudinal signal is eliminated by isolation transformer 103, due to the fact that there is no ground return on this transformer. The output of the transformer is applied to amplifiers 106 and 113 and the output of amplifier 113 is applied to the negative terminal of amplifier 119. Similarly, the output of amplifier 106 is applied, via amplifier 110, to the positive terminal of amplifier 119. The output of amplifier 119 is equal to zero if its inputs are equal in amplitude and equal in phase. The Differential signals, however, are communicated unhindered through transformer 103, amplifiers 106, 110, 113 and 119 and are applied to amplifiers 123, 126 and 129. The differential signals are then applied to the subscriber telephone. Components in FIG. 8 not described herein function in a manner well known in the art and, thus, no further description is required.

The foregoing disclosure and description of the invention is illustrative, and various changes may be made within the scope of the appended claims without departing from the spirit of the invention.

We claim:

1. Apparatus for balancing the phase and amplitude of first and second signals transmitted and received over a telephone local loop, said first signal being coupled between a ring conductor and earth ground, and said second signal being coupled between a tip conductor and earth ground, said apparatus comprising:
   first means for detecting a difference in amplitude between said first and second signals,
   second means for detecting a difference in phase between said first and second signals,
   programmable digital processing means, responsive to said first amplitude difference detecting means and said second phase difference detecting means, for generating digital control signals indicative of the difference in phase and amplitude between said first and second signals,
   first means responsive to said control signals for equalizing the amplitude of said first and second signals, and
   second means responsive to said control signals for equalizing the phase of said first and second signals.

2. Apparatus in accordance with claim 1, wherein said first amplitude difference detecting means includes a first differential amplifier for detecting positive differences in amplitude, a second differential amplifier for detecting negative differences in amplitude, a third differential amplifier for indicating zero difference in amplitude, and means for converting the analog outputs of said first, second and third amplifiers into a first digital command signal for use by said programmable digital processing means.

3. Apparatus in accordance with claim 2, wherein said second phase difference detecting means includes first and second operational amplifiers, first means responsive to a difference in output between said first and second operational amplifiers for indicating a difference in phase between said first and second signals, second means responsive to identical outputs from said first and second operational amplifiers for indicating the same phase for said first and second signals, and third means responsive to said first and second means for generating a second digital command signal for use by said programmable digital processing means.

4. Apparatus in accordance with claim 1, wherein said first amplitude equalizing means includes first means for converting said digital control signals from said programmable digital processing means into a first analog control signal, means for fixing the amplitude of said first signal at a constant amplitude level, and means responsive to said first analog control signal for adjusting the amplitude level of said second signal to match said constant amplitude level.

5. Apparatus in accordance with claim 4, wherein said second phase equalizing means includes second means for converting said digital control signals from said programmable digital processing means into a second analog control signal, means for fixing the phase of said first signal at a constant phase angle, and means responsive to said second analog control signal for adjusting the phase of said second signal to match the phase of said first signal.

6. Apparatus in accordance with claim 5, wherein said phase adjusting means includes a FET transistor in combination with a capacitor, said FET transistor varying in resistance in response to said second analog control signal.

7. Apparatus in accordance with claim 1, wherein voice signals are transmitted from a subscriber telephone to a telephone central office over said telephone local loop simultaneous with said first and second signals, said apparatus further including means for preventing said first and second signals from reaching said telephone subscriber while permitting said voice signals to reach said telephone subscriber.

8. Apparatus in accordance with claim 1, wherein there is further included means for comparing the phase and amplitude of said first and second signals received over said telephone local loop, and means responsive to said comparing means for rejecting first and second signals between which there is a phase and amplitude difference.

9. Apparatus in accordance with claim 8, wherein there is further included means for eliminating interference between signals transmitted over said telephone local loop and signals received over said telephone local loop.

* * * * *